United States Patent
Laurello et al.

(10) Patent No.: US 7,017,349 B2
(45) Date of Patent: Mar. 28, 2006

(54) GAS TURBINE AND BLEEDING METHOD THEREOF

(75) Inventors: Vincent Laurello, Miami, FL (US); Masanori Yuri, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/358,336

(22) Filed: Feb. 5, 2003

(65) Prior Publication Data

US 2004/0148943 A1 Aug. 5, 2004

(51) Int. Cl.
*F02C 7/12* (2006.01)
*F02C 7/18* (2006.01)

(52) U.S. Cl. .............. 60/782; 60/785; 60/806
(58) Field of Classification Search ........... 60/782, 60/785, 786, 806; 415/115
See application file for complete search history.

(56) References Cited

U.S. PATENT DOCUMENTS

| | | | | |
|---|---|---|---|---|
| 2,988,325 A | * | 6/1961 | Dawson | 415/115 |
| 3,832,090 A | * | 8/1974 | Matto | 415/115 |
| 5,144,794 A | * | 9/1992 | Kirikami et al. | 60/806 |
| 5,645,397 A | * | 7/1997 | Soechting et al. | 415/115 |
| 5,918,458 A | * | 7/1999 | Coffinberry et al. | 60/785 |
| 6,053,701 A | * | 4/2000 | Ichiryu et al. | 415/115 |
| 6,405,538 B1 | * | 6/2002 | Akiyama et al. | 60/782 |
| 6,574,966 B1 | * | 6/2003 | Hidaka et al. | 60/806 |
| 6,585,482 B1 | * | 7/2003 | Liotta et al. | 415/116 |

FOREIGN PATENT DOCUMENTS

JP 7-54669 2/1995

* cited by examiner

*Primary Examiner*—Ted Kim
(74) *Attorney, Agent, or Firm*—Oblon, Spivak, McClelland, Maier & Neustadt, P.C.

(57) ABSTRACT

Bleeding is operated by annularly providing plural stationary blades at an interior side of a vehicle; annularly providing plural moving blades around rotor disk adjacent to stationary blades; providing plural stage units comprising the stationary and moving blades; introducing bleed air into each stage unit from a compressor; supplying bleed air extracted from a final stage of the compressor into a first stage unit; and supplying bleed air extracted from compressed air which has not yet arrived at a final stage unit of the compressor.

6 Claims, 3 Drawing Sheets

GAS TURBINE AND BLEEDING METHOD THEREOF

BACKGROUND OF THE INVENTION

1. Field of the Invention

The present invention relates to a gas turbine, and to a bleeding method thereof, that is rotationally driven using combusted gas from a combustor.

2. Description of Related Art

In a gas turbine plant, compressed air from a compressor is guided into a combustor, and the high-temperature gas generated during combustion of the compressed air together with a fuel is guided into the gas turbine to drive the gas turbine. A typical design is one in which a portion of the compressed air is introduced into a cooling device as bleed air and is cooled. The cooled bleed air is subsequently guided to stationary and moving blades on the gas turbine side, and is used to cool these blades and as sealing air between the moving and stationary blades.

An example of a structure for bleeding in a conventional gas turbine will be explained below with reference to FIG. 3. A compressor, which would be to the left on the page but is not shown in the figure, is coaxially connected to the gas turbine. Note that in the following discussion, the left side of the drawing will be referred to as the "upstream side" and right side of the paper will be referred to as the "downstream side". Furthermore, the direction of the rotation axis (to the left and right on the paper) of a rotor of the gas turbine will be referred to as the "axial direction".

In FIG. 3, plural moving blades $1b$, $2b$, $3b$, and $4b$ are coaxially disposed annularly around a first stage rotor disk $1a$, a second stage rotor disk $2a$, a third stage rotor disk $3a$, and a fourth stage rotor disk $4a$, respectively. Plural stationary blades (not shown) are annularly disposed so that each stationary blade is coaxial to each stage moving blade on the interior side of a vehicle, which is not shown, at the downstream side of moving blades $1b$ to $4b$. These stationary blades are corresponding to moving blades $1b$ to $4b$ at the downstream side respectively to compose the first stage unit 1 to the fourth stage unit 4.

Furthermore, seal disk 5 is coaxially connected to first stage unit 1 at the upstream. Disk hole $5a$ is penetrating holes through which bleed air f from the upstream passes toward moving blades $1b$ to $4b$ of stage units 1 to 4. In seal disk 5, plural disk holes $5a$ are formed centered about the axis and at equal angle intervals from one another.

Plural radial holes $1a1$ are formed in rotor disk $1a$ of first stage unit 1 with equal angle intervals from one another. Radial holes $1a1$ lead a portion of bleed air f after passing through disk holes $5a$ into a cooling flow path formed in moving blade $1b$. Furthermore, in rotor disk $1a$, plural disk holes $1a2$ are formed for supplying the rest of bleed air f into second stage unit 2 with equal angle intervals from one another.

As similar to first stage unit 1, plural radial holes $2a1$ and $3a1$, and $2a2$ and $3a2$ are formed in rotor disk $2a$ of second stage unit 2 and rotor disk $3a$ of third stage unit 3, respectively.

In rotor disk $4a$ of fourth stage unit 4, plural radial holes $4a1$ are formed.

A bleeding method of a conventional gas turbine which has the above-described constitution will be explained.

A portion of bleed air f supplied from the final stage of the compressor (the final compressing stage) is supplied into a space between inside shrouds of the stationary blades and inside shrouds of moving blades $1b$ of first stage unit 1 in order to seal to prevent from leaking combustion gas. The rest of bleed air f is supplied toward seal disk 5 which is rotating, and supplied rotor disk $1a$ of first stage unit 1 after passing through disk holes $5a$.

Bleed air f which has passed through radial holes $1a1$ is supplied into a flow path formed in each first stage moving blade $1b$ to cool first stage moving blades $1b$ from thereinside. On the other hand, bleed air f which has passed through disk holes $1a2$ is supplied into rotor disks $2a$ of second stage unit 2. Furthermore, a portion of bleed air f is used for cooling moving blades $2b$ in second stage unit 2, similar to first stage unit, and the rest of bleed air f is supplied into third stage unit 3. Similarly, a portion of bleed air f is used for cooling moving blades $3b$ in third stage unit 3 and the rest of bleed air f is supplied into fourth stage unit 4 which is the final stage for cooling moving blades $4b$ in fourth stage unit 4.

In the above-described conventional gas turbine, there are some problems as explained below.

Since bleed air f supplied from the compressor has too high pressure to use for cooling moving blades, supply pressure of bleed air f is decreased by passing bleed air f through narrow radial holes $1a1$, $2a1$, $3a1$, and $4a1$, and passing bleed air f through plural orifice plates (not shown) which are provided in moving blades $1b$ to $4b$ in order to control a flow rate, and as a result, the efficiency becomes deteriorated.

In the conventional gas turbine plant, a portion of power generated in the gas turbine is used for rotational driving force of the above-described compressor. Bleed air f is compressed by the compressor so as to have high pressure. However, for using as bleed air f, the pressure of the compressed air must be decreased. Therefore, the efficiency of the rotational driving power becomes lower, and when generation efficiency in a power plant using the gas turbine plant is considered, an amount of power to be used for rotating a generator by the gas turbine decreases, so that the generation efficiency decreases.

BRIEF SUMMARY OF THE INVENTION

In light of the above problems, an object of the present invention is to provide a gas turbine and bleeding method thereof that can decrease power loss by bleeding from a compressor and improve thermal efficiency of the gas turbine.

The present invention employs the following means to resolve the above-described problems.

A gas turbine according to a first aspect of the present invention comprises plural stationary blades which are annularly provided at an interior side of a vehicle; plural moving blades which are annularly provided around rotor disk adjacent to stationary blades; plural stage units comprising the stationary and moving blades; a compressor for supplying bleed air into stage units; a first bleeding line for supplying bleed air into a first stage unit; and a second bleeding line, other than the first bleeding line, for supplying bleed air into a second and subsequent stage units.

According to the above-described gas turbine, since it is not necessary to use bleed air from the final stage unit of the compressor for supplying into the second and subsequent stage units, a flow amount of bleed air which is flowing in the first bleeding line and has relatively high pressure can be comparatively decreased with the conventional gas turbine. Namely, when a portion of compressed air compressed by the compressor is used as bleed air, high pressure bleed air obtained by passing through the final stage of the compressor is required only in the first stage unit which needs relative high pressure of bleed air. The second and subsequent stage units needs relative low pressure of bleed air. Therefore, the flow amount of bleed air to flow into the first bleeding line (that is, a flow amount of air to be compressed in the first to the final stage units of the compressor for supplying bleed air) can be decreased, and at the same time, driving power of the gas turbine (a work amount of compression of the compressor) to rotate the compressor can be decreased. As bleed air for supplying into the second bleeding line, for example, air extracted from compressed air which is still not arrived at the final stage unit of the compressor can be used. Therefore, power loss by bleeding from the compressor is decreased and thermal efficiency of the gas turbine is improved.

Furthermore, in the gas turbine of the first aspect, a swirling flow generating device which converts bleed air for supplying the second and subsequent stage units into swirling flow rotating in the same direction of rotation of the units may be provided in the second bleeding line.

According to the above-described gas turbine, since bleed air for supplying is converted into swirling flow by the swirling flow generating device, a difference of relative speed in the circumferential direction between rotation speed of rotor disks and bleeding speed can be decreased. Therefore, power of the gas turbine is prevented from being reduced by supplying bleed air, and the thermal efficiency of the gas turbine is further improved.

Furthermore, in the above-described gas turbine provided with the swirling flow generating device, a bleeding pipe for leading bleed air from the compressor into a rotor disk of the final stage unit may be provided in the second bleeding line and the swirling flow generating device may be a first TOBI nozzle which is connected to a discharge port of the bleeding pipe.

According to the above-described gas turbine, power loss by bleeding from the compressor is securely decreased and thermal efficiency of the gas turbine is improved.

Furthermore, in the above-described gas turbine provided with the swirling flow generating device, a bleeding flow path for leading bleed air from the compressor into stationary blades of units other than the first stage unit may be provided in the second bleeding line and the swirling flow generating device may be a second TOBI nozzle which is provided in each inside shroud of the stationary blades introducing the bleed air from the bleeding flow path.

According to the above-described gas turbine, power loss by bleed air from the compressor is securely decreased and thermal efficiency of the gas turbine is improved.

A bleeding method of a gas turbine according to a second aspect of the present invention comprises the steps of: annularly providing plural stationary blades at an interior side of a vehicle; annularly providing plural moving blades around rotor disk adjacent to stationary blades; providing plural stage units comprising the stationary and moving blades; introducing bleed air into the stage units from a compressor; supplying bleed air extracted from the final stage of the compressor into a first stage unit; and supplying bleed air extracted from compressed air which has still not arrive at a final stage unit of the compressor.

According to the above-described bleeding method of gas turbine, though the compressed air passing through the compressor gradually increases pressure thereof by compression of the compressor, since bleed air is extracted from the compressed air which has still not arrived at the final stage unit of the compressor via a bleeding line, the work of compressing air from the first to final stage unit for bleeding is not required. Namely, since compression at the final stage unit is not required as conventionally, driving power of the gas turbine to rotate the compressor can be decreased. Therefore, power loss by bleeding from the compressor is decreased and thermal efficiency of the gas turbine is improved.

Furthermore, the bleeding method of gas turbine of the second aspect may comprise a step of converting bleed air for supplying the second and subsequent stage units into swirling flow which rotates in the same direction of rotation of the units.

According to the above-described bleeding method of gas turbine, since bleed air is converted into swirling flow for supplying beforehand, a difference of relative speed in the circumferential direction between rotation speed of rotor disks and bleeding speed can be decreased. Therefore, power of the gas turbine is prevented from being reduced by supplying bleed air, and the thermal efficiency of the gas turbine is further improved.

DETAILED DESCRIPTION OF THE INVENTION

Several embodiments of a gas turbine of the present invention will be explained with reference to the figures. The present invention is of course not limited to the embodiments.

Note that in the following discussion, the flow directions of bleed air F on the upstream side (i.e., left sides of the papers in FIGS. 1 and 2) and the flow directions of bleed air F on the downstream side (i.e., right side of the papers in FIGS. 1 and 2) will be referred to as "upstream side" and "downstream side" respectively. Furthermore, the direction of a rotation axis (to the left and right in FIGS. 1 and 2) of the rotating member that includes a rotor disk of each stage unit will be referred to as "axial direction" in the discussion.

The first embodiment according to the present invention will be explained with reference to FIG. 1.

Figure 1:
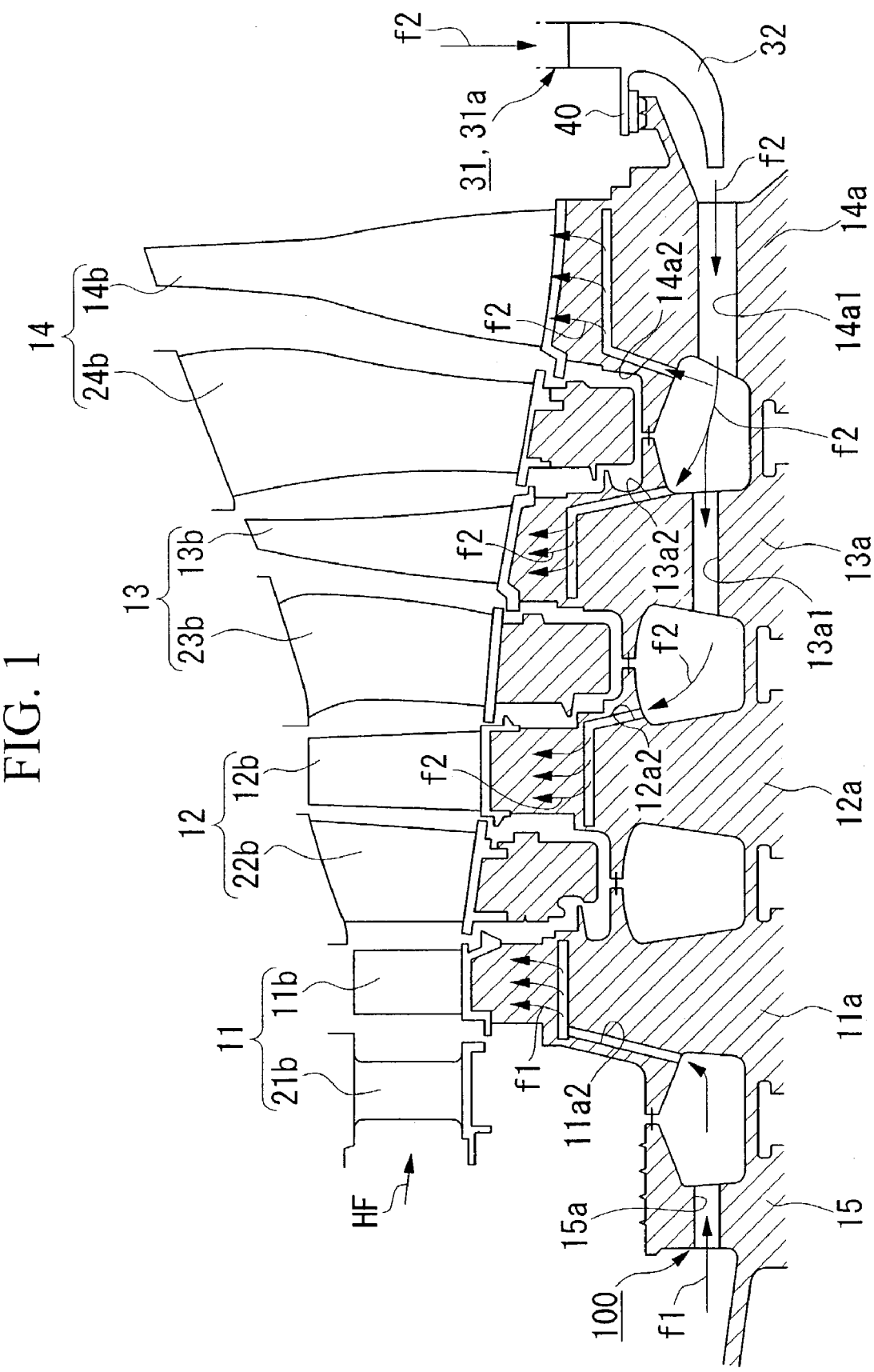
FIG. 1 is a view showing a first embodiment of a gas turbine according to the present invention, and is a partial cross-sectional view explaining a structure of bleeding for each stage unit.

In FIG. 1, plural moving blades 1b to 14b are coaxially disposed annular around the first to fourth stage rotor disks 11a to 14a respectively. Plural stationary blades 21b to 24b are annularly disposed on the interior side of a vehicle (not shown) on the downstream side of moving blades 11b to 14b so as to be coaxial to moving blades 11b to 14b. Then, the first stage unit 11 to the fourth stage unit 14 are composed of pairs of stationary blades 21b to 24b and moving blades 11b to 14b on the downstream side, respectively.

Seal disk 15 is coaxially connected to the upstream side of the first stage unit 11. Plural disk holes 15a are formed on the upstream side of the first stage unit 11 at the axis of each disk hole as the center at equal angular distances from one another. Disk hole 15a is a penetrating hole for supplying bleed air f1 from the upstream side into moving blades 11b of the first stage unit 11.

Furthermore, a compressor (not shown) is disposed on left side of the paper in FIG. 1 and a rotation axis of the compressor is coaxially connected to the rotation member including rotor disks 11a to 14a. Therefore, the compressor is rotationally driven in accordance with rotation force of rotor disks 11a to 14a of the gas turbine.

Moreover, a generator (not shown) is disposed on the right side of the drawing in FIG. 1 and a rotation axis of the generator is coaxially connected to the rotation member including rotor disks 11a to 14a. Therefore, the generator is rotationally driven in accordance with the power of rotor disks 11a to 14a of the gas turbine.

Moving blades 11b to 14b rotationally drive rotor disks 11a to 14a by introducing combustion gas HF from a combustor (not shown). Stationary blades are annularly disposed on the interior side of the vehicle so as to be coaxial to rotor disks 11a to 14a.

Rotor disks 11a to 14a are coaxially overlapped to be a rotor. The rotor is connected coaxial to a rotor of the compressor via seal disk 15 and the like.

The gas turbine of the first embodiment is characterized in that low pressure bleeding line 31 (the second bleeding line) is provided for supplying bleed air f2, which is extracted from compressed air being not yet arrived at the final stage unit of the compressor, into second stage unit 12 and subsequent stage units (the fourth stage unit 14 in the present embodiment) among the first stage unit 11 to the fourth stage unit 14. Low pressure bleeding line 31 is provided in addition to high pressure bleeding line 100 (the first bleeding line) for supplying bleed air f1 into first stage unit 11.

Along low pressure bleeding line 31, a cooler (not shown) is connected to decrease a temperature of bleed air f2 before discharging. Furthermore, bleeding pipe 31a is provided in low pressure bleeding line 31, and leads bleed air f2 after cooling in the cooler into the downstream side of rotor disk 14a of fourth stage unit 14, which is the final stage unit among first stage unit 11 to fourth stage unit 14.

Furthermore, TOBI nozzle 32 (tangential on board injection nozzle; the first TOBI nozzle), which is as a swirling flow generating device for converting bleed air f2 for supplying into second stage unit 12 and subsequent stage units into swirling flow rotating in the same direction of rotation of first stage unit 11 to fourth stage unit 14, is connected to the end of bleeding pipe 31a to be used as a discharging port.

Moreover, plural disk holes 14a1 are provided at equal angular distances from one another on rotor disk 14a in order to flow bleed air f2 from TOBI nozzle 32 toward the upstream side. Furthermore, plural radial holes 14a2 are provided at equal angular distances from one another on rotor disk 14a for extracting a portion of bleed air f2 after flowing through disk holes 14a1 and leading the portion of bleed air f2 into a cooling flow path formed inside moving blades 14b.

Similar to fourth stage unit 14, plural disk holes 13a1 are provided at equal angular distances from on another on rotor disk 13a of third stage unit 13 in order to flow bleed air f2 from fourth stage rotor disk 14a toward the upstream side. Furthermore, plural radial holes 13a2 are provided at equal angular distances from one another on rotor disk 13a for extracting a portion of bleed air f2 from fourth stage rotor disk 14a and leading the portion of bleed air f2 into a cooling flow path formed inside moving blades 13b.

Subsequently, plural radial holes 12a2 are provided at equal angular distances from one another on rotor disk 12a of second stage unit 12 for extracting a portion of bleed air f2 from third stage rotor disk 13a and leading the portion of bleed air f2 into a cooling flow path formed inside moving blades 12b. Additionally, rotor disk 12a does not have any disk hole, so that bleed air f2 cannot flow toward first stage unit 11.

Bleeding into first stage unit 11 is conventionally operated by supplying bleed air f1 which is extracted from the final stage unit of the compressor via the high pressure bleeding line 100 into first stage unit 11. This bleed air f1 flows to the downstream side after passing through disk holes 15a of seal disk 15, passes through plural radial holes 11a2 provided on rotor disk 11a, and is led into the cooling flow path provided inside moving blades 11b. Furthermore, the high pressure bleeding line 100 is a flow path from the final stage unit of the compressor to just before inlets of radial holes 11a2.

Next, a bleeding method of the gas turbine having the above-described constitution of the first embodiment will be explained as follows.

In the compressor, pressure compressed air passing therethrough becomes gradually higher by compression operation of the compressor. Then, a portion of the compressed air which does not yet arrive at the final stage unit is extracted via low pressure bleeding line 31 as bleed air f2 (for example, bleed air f2 is extracted from the middle stage unit of the compressor).

Bleed air f2 is supplied into rotor disk 14a of fourth stage unit 14 after passing through bleeding pipe 31a, and at the same time, this bleed air f2 is converted into swirling flow by TOBI nozzle 32. Since bleed air f2 which is swirling flow is discharged into disk holes 14a1 with the same speed as or higher rotation speed than rotor disk 14a (rotation speed as the rotation axis of rotor disk 14a is the center line), rotation power of rotor disk 14a is assisted and improved. For preventing bleed air f2 from a space between bleeding pipe 31a and rotor disk 14a, labyrinth seal 40 is provided in the space.

A portion of bleed air f2 which flows by the upstream side of rotor disk 14a via disk holes 14a1 is supplied into moving blades 14b and 13b via radial holes 14a2 and 13a2 and cools moving blades 14a and 13a. The rest of bleed air f2 flows by the upstream side of rotor disk 13a via disk holes 13a1, and is supplied into radial holes 12a2 of rotor disk 12a and cools moving blades 12b.

On the other hand, first stage unit 11 is supplied with bleed air f1 which is extracted from the final stage of the compressor. Seal disk 15 is supplied with bleed air f1 which is converted into swirling flow via TOBI nozzle (not shown). Bleed air f1 passes through disk holes 15a and subsequently passes through radial holes 11a2, and is supplied into moving blades 11b and cools moving blades 11b.

The gas turbine according to the first embodiment as described above has a constitution comprising low pressure bleeding line 31 extracting bleed air f2 from the compressed air which does not yet arrive the final stage unit of the compressor and supplying this bleed air f2 into rotor disk 14a of fourth stage unit 14. According to the constitution, though the compressed air passing through the compressor becomes gradually higher pressure by compression operation of the compressor, a portion of the compressed air which does not yet arrive at the final stage unit is extracted via low pressure bleeding line 31 as bleed air f2, so that a work of compressing air from the first to final stage unit for bleeding is not required. Namely, since compression at the final stage unit is not required as conventional, driving power of the gas turbine to rotate the compressor can be decreased. Therefore, power loss by bleeding from the compressor is decreased and thermal efficiency of the gas turbine is improved.

Furthermore, the gas turbine according to the present embodiment as described above has a constitution comprising TOBI nozzle 32 which converts bleed air f2 for supplying to rotor disk 14*a* into swirling flow rotating in the same direction as rotation direction of rotor disk 14*a*, connecting to low pressure bleeding line 31. According to the constitution, a difference of relative speed in the circumferential direction between rotation speed of rotor disks and bleeding speed is decreased. Therefore, power of the gas turbine is prevented from being reduced due to supplying bleed air, and the thermal efficiency of the gas turbine is further improved.

Figure 2:
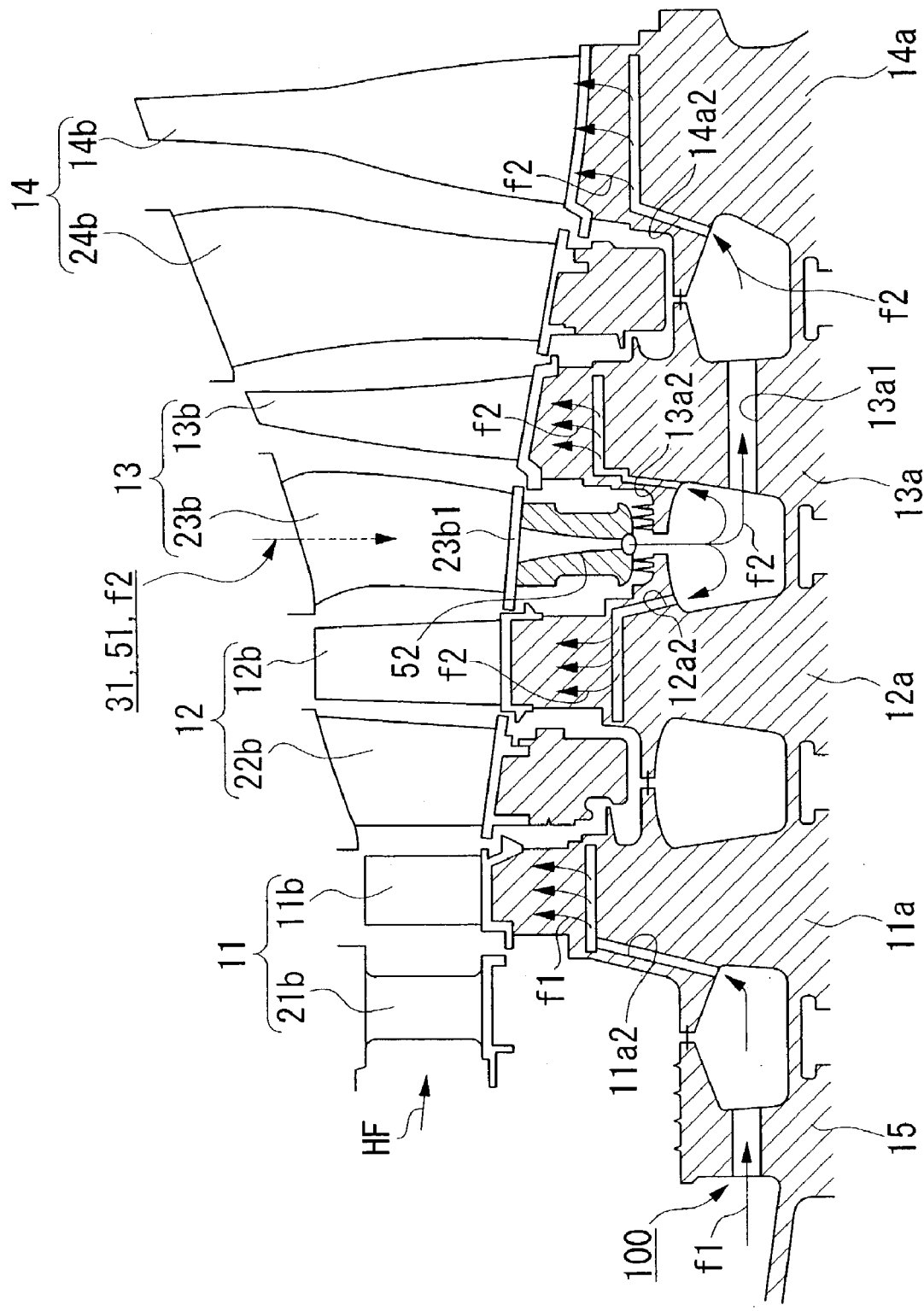
FIG. 2 is a view showing a second embodiment of a gas turbine according to the present invention, and is a partial cross-sectional view explaining a structure of bleeding for each stage unit.
Figure 3:
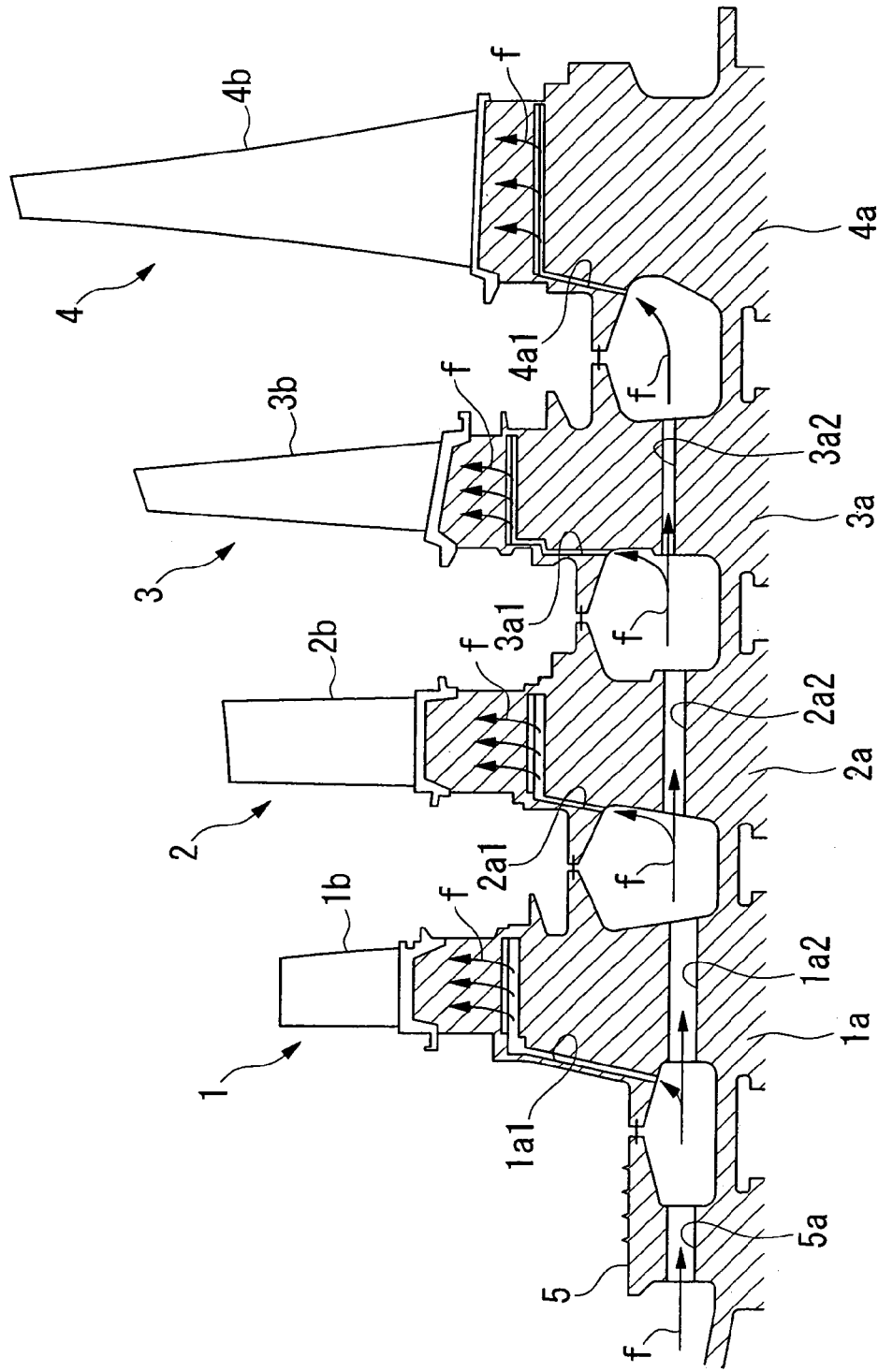
FIG. 3 is a view showing a conventional gas turbine, and is a partial cross-sectional view explaining a structure of bleeding for each stage unit.

Next, the second embodiment according to the present invention will be explained with reference to FIG. 2. Different points with respect to the first embodiment will be mainly explained and the similar points will be omitted.

One of the characteristics of a gas turbine according the second embodiment is to provide low pressure bleeding flow path 51, which leads bleed air f2 from the compressor into stationary blades 23*b* of third stage unit 13 that is one of the units other than the first stage unit 11 among first stage unit 11 to fourth stage unit 14, into the above-described low pressure bleeding line 31. Furthermore, another characteristic is to provide TOBI nozzle 52 which converts bleed air f2, which is introduced into stationary 23*b* of inside shroud 23*b*1, into swirling flow rotating in the same direction as rotation direction of rotor disks 12*a* and 13*a*.

In rotor disks 14*a* according to this embodiment, disk holes 14*a*1 are not provided, and only radial holes 14*a*2 are provided. Therefore, bleed air f2 does not flow out toward the downstream side further than rotor disks 14*a*.

Furthermore, in rotor disks 14*a* of third stage unit 13, similarly to the first embodiment, radial holes 13*a*2 and disk holes 13*a*1 are provided. However, in the second embodiment, radial holes 13*a*2 are provided at the upstream side further than rotor disk 13*a*.

Moreover, in rotor disks 12*a* of second stage unit 12*a*, similarly to the first embodiment, radial holes 12*a*2 are provided. This rotor disks 12*a* do not comprise a disk hole, so that bleed air f2 does not flow out toward first stage unit 11.

Bleeding into first stage unit 11 is to supply bleed air f1 extracted from the final stage unit of the compressor, as conventionally. This bleed air f1 passes through the downstream side via disk holes 15*a* of seal disks 15, and is introduced into a cooling flow path provided inside moving blades 11*b* after passing through plural radial holes 11*a*2 provided in rotor disks 11*a*.

Next, a bleeding method of the gas turbine having the above-described constitution of the second embodiment will be explained as follows.

In the compressor, pressure compressed air passing therethrough becomes gradually higher by compression operation of the compressor. Then, a portion of the compressed air which does not yet arrive at the final stage unit is extracted via low pressure bleeding line 31 as bleed air f2 (for, example, bleed air f2 is extracted from the middle stage unit of the compressor).

Bleed air f2 is supplied into stationary blades 23*b* after passing through low pressure bleeding flow path 51 to cool stationary blades 23*b*. Subsequently, bleed air f2 discharged from TOBI nozzle 52 is supplied into a space between rotor disks 12*a* and 13*a* with forming swirling flow, and a portion of bleed air f2 flows toward radial holes 12*a*2 and 13*a*2 and the rest is supplied into rotor disks 14*a* via disk holes 13*a*1.

Furthermore, bleed air f2, after passing through radial holes 12*a*2, cools moving blades 12*b* and bleed air f2 after passing through radial holes 13*a*2 cools moving blades 13*b*.

At the same time, bleed air f2, which is swirling flow, is discharged into disk holes 13*a*1 and radial holes 12*a*2 and 13*a*2 with the same speed as or higher rotation speed than rotor disks 12*a* and 13*a* (rotation speed as the rotation axis of rotor disks 12*a* and 13*a* is the center line), rotation power of rotor disks 12*a* and 13*a* is assisted and improved.

On the other hand, first stage unit 11 is supplied with bleed air f1 which is extracted from the final stage unit of the compressor. Seal disk 15 is supplied with bleed air f1 which is converted into swirling flow via TOBI nozzle (not shown). Bleed air f1 passes through disk holes 15*a* and subsequently passes through radial holes 11*a*2, and is supplied into moving blades 11*b* and cools moving blades 1*b*.

The gas turbine according to the second embodiment as described above has a constitution comprising TOBI nozzle 52 converting bleed air f2 into swirling flow after extracting bleed air f2 from the compressed air which has not yet arrived at the final stage unit of the compressor and supplying the bleed air f2 into the space between rotor disks 12*a* and 13*a*. According to the constitution, as similar to the first embodiment, since a work of compressing air from the first to final stage unit for bleeding is not required, driving power of the gas turbine to rotate the compressor can be decreased. Therefore, power loss by bleeding from the compressor is decreased and thermal efficiency of the gas turbine is improved.

Furthermore, the gas turbine according to the second embodiment as described above has a constitution comprising TOBI nozzle 52 which converts bleed air f2 into swirling flow and supplying the bleed air f2 into the space between rotor disks 12*a* and 13*a*. According to the constitution, a difference of relative speed between rotation speed of rotor disks 12*a* and 13*a* and bleeding speed of bleed air f2 is decreased. Therefore, power of the gas turbine is prevented from being reduced due to supplying bleed air, and the thermal efficiency of the gas turbine is further improved.

What is claimed is:

1. A gas turbine comprising:
   plural stationary blades which are annularly provided at an interior side of a vehicle;
   plural moving blades which are annularly provided around plural rotor disks adjacent to stationary blades;
   plural stage units comprising the stationary and moving blades;
   a compressor for supplying bleed air into stage units;
   a first bleeding line for supplying bleed air into a first stage unit; and
   a second bleeding line, other than the first bleeding line, for supplying bleed air into a second stage unit and subsequent stage units,
   wherein said second bleed line is connected to a plurality of cavities connected in series, wherein one cavity of the plurality of cavities has a first plurality of radially extending holes provided at angular distances from one another on a first rotor disk and configured to provide flow paths to moving blades on a first subsequent stage unit of the subsequent stage units, and wherein the one cavity has a second plurality of radially extending holes provided at angular distances from one another on a second rotor disk and configured to provide flow paths to moving blades on a second susequent stage unit of the susequent stage units.

2. A gas turbine according to claim 1, comprising a swirling flow generating device which converts bleed air for supplying the second and subsequent stage units into swirling flow rotating in a same direction of rotation of the units in the second bleeding line.

3. A gas turbine according to claim 2, comprising a bleeding pipe for leading bleed air from the compressor into a rotor disk of a final stage unit of the susequent stage units in the second bleeding line, wherein the swirling flow generating device is a TOBI nozzle which is connected to a discharge port of the bleeding pipe,
and wherein the bleed air which is led to the final stage unit flows towards the second stage unit in a direction opposite to a direction in which the combusted gas flows.

4. A gas turbine according to claim 2, comprising a bleeding flow path for leading bleed air from the compressor into stationary blades of units other than the first stage unit, wherein the swirling flow generating device is a TOBI nozzle which is provided in each inside shroud of the stationary blades introducing the bleed air from the bleeding flow path.

5. A bleeding method of a gas turbine comprising the steps of:
annularly providing plural stationary blades at an interior side of a vehicle;
annularly providing plural moving blades around plural rotor disks adjacent to stationary blades;
providing plural stage units comprising the stationary and moving blades;
introducing bleed air into each stage unit from a compressor;
supplying bleed air extracted from a final stage of the compressor into a first stage unit; and
supplying bleed air extracted from compressed air which has not yet arrived at a final stage unit of the compressor, said bleed air being provided to a plurality of cavities connected in series, wherein one cavity of the plurality of cavities has a first plurality of radially extending holes provided at angular distances from one another on a first rotor disk and configured to provide flow paths to moving blades on a first subsequent stage unit of the subsequent stage units, and wherein the one cavity has a second plurality of radially extending holes provided at angular distances from one another on a second rotor disk and configured to provide flow paths to moving blades on a second susequent stage unit of the subsequent stage units.

6. A bleeding method of a gas turbine comprising a step of converting bleed air for supplying the second and subsequent stage units into swirling flow which rotates in a same direction of rotation of the units, wherein said bleed air is provided to a plurality of cavities connected in series, wherein one cavity of the plurality of cavities has a first plurality of radially extending holes provided at angular distances from one another on a first rotor disk and configured to provide flow paths to first moving blades on a first subsequent stage unit of the susequent stage units, and wherein the one cavity has a second plurality of radially extending holes provided at angular distances from one another on a second rotor disk and configured to provide flow paths to second moving blades on a second susequent stage unit of the susequent stage units.

* * * * *